United States Patent
Bolton

[15] 3,697,745
[45] Oct. 10, 1972

BEST AVAILABLE COPY

[54] FLUX NULLED WHEEL DETECTOR

[72] Inventor: Norman A. Bolton, Scottsville, N.Y.

[73] Assignee: General Signal Corporation, Rochester, N.Y.

[22] Filed: May 18, 1970

[21] Appl. No.: 38,085

[52] U.S. Cl. ............................ 246/249, 340/258 D
[51] Int. Cl. ...................................... B61l 13/04
[58] Field of Search ........ 246/249; 340/258 C, 258 D

[56] References Cited

UNITED STATES PATENTS 3,210,539  10/1965  Malaquin .................. 246/249

FOREIGN PATENTS OR APPLICATIONS 1,185,645  1/1965  Germany .................. 246/249

Primary Examiner—Arthur L. La Point
Assistant Examiner—George H. Libman
Attorney—Harold S. Wynn and Milton E. Kleinman

[57] ABSTRACT

An apparatus for detecting the presence of a ferromagnetic vehicle wheel has been provided. A primary coil energized with an alternating current input signal produces a magnetic field in the vicinity of the rail on which the wheel is moving. A secondary coil responsive to the field is aligned in the primary field such that a null or zero signal exists at the output of the secondary in the absence of a vehicle wheel. The presence of a wheel in the primary field disturbs that field sufficiently to produce an output in the secondary coil, thus providing indication of wheel presence.

9 Claims, 3 Drawing Figures

PATENTED OCT 10 1972 3,697,745

FLUX NULLED WHEEL DETECTOR

BACKGROUND OF INVENTION

This invention relates to presence detection apparatus and in particular to magnetically responsive vehicle wheel presence detectors.

The apparatus necessary for accurately detecting the presence of a vehicle wheel may range from a purely mechanical device such as a treadle switch through electromechanical and purely electronic devices such as photoelectric devices and the like. Schemes using magnetically responsive devices for detecting the presence of a vehicle wheel have been disclosed in the art, but in many cases serious shortcomings arise which are difficult to cope with and may require alternate apparatus in order to achieve the desired result. Some magnetic wheel detectors utilize inert devices such as a permanent magnet on one side of a wheel path such as the rail on a railroad right of way and a receiver on the other side which is responsive to the flux associated with the permanent magnet. A vehicle wheel moving along the railroad right of way upon passing between the permanent magnet and the receiver diverts the flux from the magnet such that a reaction indicative of wheel presence is generated in the receiver. This occurs because the wheels of a railroad vehicle are ferromagnetic and the presence of the wheel may cause a change in flux patterns which is sensed by the receiver. However, it is the rate of change in the flux pattern which determines the presence of a vehicle and if the wheel enters the field of the permanent magnet slowly, a change in the flux pattern may not be sufficient to provide adequate indication of the presence of a wheel. Another alternative to the magnetic detector again uses a magnet on the inside of a rail and a detector on the same side spaced such that the flange of a vehicle wheel passing adjacent to the magnet and detection couples the flux to the detector and when the wheel is not present, there is very little, if any, coupling of the flux. Under these circumstances, however, a rapidly moving wheel may not couple the flux from the transmitter for a sufficiently long time for an accurate wheel detection. It is therefore apparent that detectors using magnetically responsive devices are somewhat limited in their application and in particular may be useless where they are particularly needed. Such needs arise in main line operation where the vehicle's speeds are rather high and an accurate and rapidly responsive wheel detector is necessary. An example of this application is the use of a wheel detector to establish wheel position for a wheel thermal scanner used for hot box detection. An application wherein a vehicle speed may be rather slow is the area of railroad classification yard operations where operating speeds may be in the range of 1 to 2 miles per hour.

It would be desirable therefore to provide an arrangement which would operate over a complete range of anticipated speeds including the stationary wheel so that designs would not have to be modified for the particular application.

It is therefore an object of the preset invention to provide an arrangement which substantially obviates the limitations and disadvantages of the described prior arrangements.

It is another object of the present invention to provide a wheel detector simplified in its physical arrangement.

It is another object of the present invention to provide an apparatus which is inexpensive in its initial construction and subsequent maintenance requirements.

SUMMARY OF INVENTION

An apparatus for detecting the presence of a ferromagnetic vehicle wheel along a right of way has been provided including a primary coil energized with an alternating current input signal for producing a magnetic field in the vicinity of the right of way. A secondary coil responsive to the field produced by the primary, is aligned in the primary field such that a null or zero secondary output exists in the absence of a vehicle wheel. The presence of a wheel in the primary disturbs the field sufficiently to produce in the secondary, an output providing indication of wheel presence.

For a better understanding of the present invention together with other and further objects thereof reference is had to the following description taken in connection with the accompanying drawings, while its scope will b pointed out in the appended claims.

DESCRIPTION OF THE PREFERRED EMBODIMENT

Figure 1:
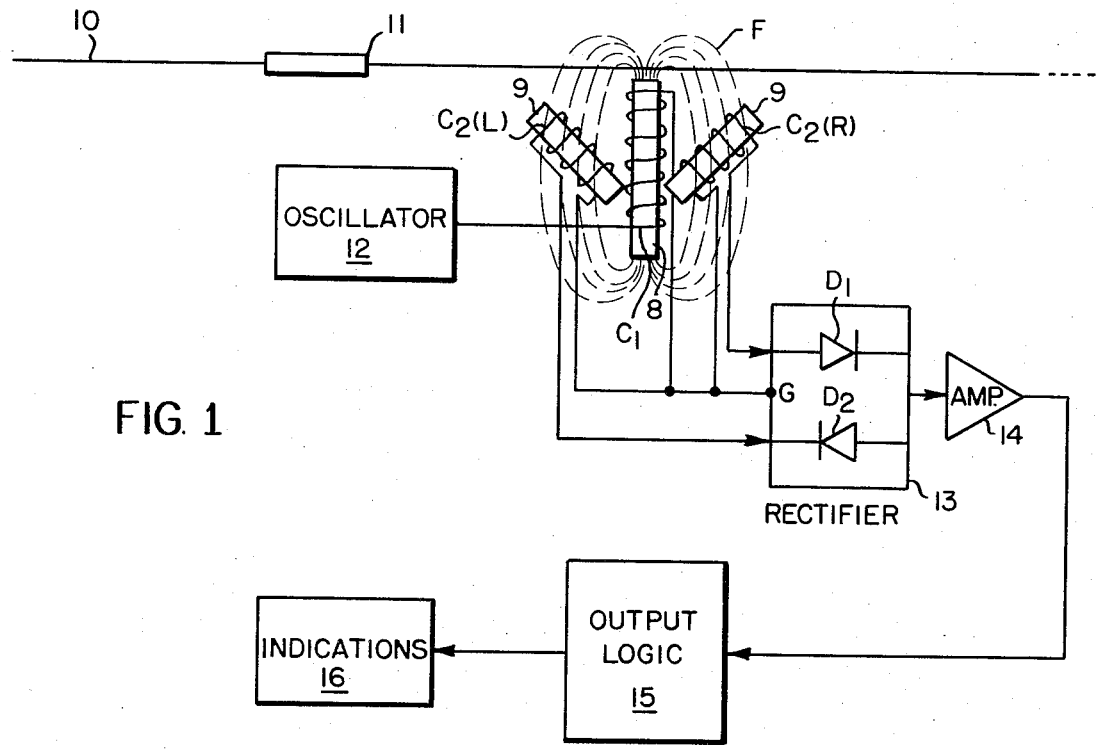
FIG. 1 shows a block diagram of the apparatus necessary for the practice of the present invention.

The concept involved in the present invention contemplates the use of a nulled device which delivers a zero output when it is undisturbed and provides a substantial output upon the introduction of that which would tend to disrupt the equilibrium existing in the nulled state.

In its present form, the apparatus of the present invention includes primary core $C_1$ and coil 8 energized for producing a magnetic field F by an oscillator 12. Secondary cores 9 and coils $C_2$ (L and R) are placed in the field F such that the flux F passing through the coils $c_2$ has no effect on their output. The coils $C_2$ (L and R) may be suitably encased coils of wire wrapped around the cores for concentrating the flux, and having output terminals connected to two diodes $D_1$ and $D_2$ in rectifier 13. A vehicle moves along the rail 10 on wheel 11. When the wheel 11 is not in the vicinity of the field F of the primary coil $C_1$, the field F oscillates in accordance with the frequency of the oscillator 12, and the outputs of the secondary coils $C_2$ (L and R) remain unresponsive because they are positioned in this field so that the flux is nulled through their cores 9. It should be noted at this time that only one secondary $C_2$ (L or R) is necessary for vehicle presence detection alone; however, if directional information were desired, two secondaries would be necessary and this condition will be explained further on in the disclosure. It will be necessary to refer the secondaries $C_2$ as $C_2$ (L or R) in that discussion but for the present it is sufficient to refer to them as $C_2$.

Although the magnetic field F is shown in FIG. 1 as being elliptical, it is understood that the metal rail 10 partially distorts the magnetic vector pattern of the field F between the primary core 8 and the secondary core 9. When the output signal from the secondary coil $C_2$ is at a null and the vehicle wheel 11 is not in the vicinity of the field F, the vector summation of the field F as it crosses the secondary core 9 is predominately in a direction normal to the core 9. The presence of the metal vehicle wheel 11 in the field F further distorts the magnetic vector pattern of the field F between primary core 8 and secondary core 9, thereby altering the vector pattern of the field F as it crosses the secondary core 9 and thus producing an output signal in secondary coil $C_2$.

As the vehicle wheel 11 approaches the position of the detector from the left, its presence in the field F causes a disruption of the nulled effect of the secondary coils $C_2$ (L and R). The null effect of the field F is disturbed because the intruding wheel 11 has changed the reluctance of the magnetic circuit of the primary coil $C_1$ and core 8. This nulled state was achieved by energizing the primary $C_1$ and placing the secondary coil $C_2$ and cores 9 in the field until no output is detected at the output terminals of the coils $C_2$. It is therefore apparent that once the state exists, anything which would interfere with the flux pattern F would change this delicate state of equilibrium. For convenience, a railroad vehicle wheel is described, however, it is conceivable that the automobile or other such vehicle might be adaptable to such a system.

As the wheel 11 approaches secondary coil $C_{2L}$ from the left and proceeds towards the other secondary coil $C_{2R}$, the field F is disturbed. A signal is thence generated in the coils $C_2$ (L and R) and their outputs are coupled to rectifier 13.

For simplicity, the rectifier 13 may include two diodes $D_1$ and $D_2$ as the wheel 11 passes through the field F, the signals produced at the outputs of the secondaries $C_2$ (L and R) are respectively coupled to each of the diodes and are rectified at opposed polarities. These signals are amplified in the amplifier 14 and transmitted to the output logic apparatus 15. The occurrence of a particular polarity signal first and then the other polarity, second, is detected by the logic 15 and directional information as well as wheel presence is provided to indications 16.

A brief discussion of the components of this system cooperating according to the principles of the present invention is as follows: Oscillator 12 generates an alternating current signal and couples the signal to the primary coil $C_1$ and core 8. This alternating current through the coil $C_1$ generates a field F at the coil $C_1$ and secondary coils $C_2$ and cores 9 are arranged in the field F such that the field has no net effect on them for producing an output in the coils $C_2$. If a vehicle wheel 11 approaches the detector apparatus from the left, the field F is disturbed such that a net signal is produced at the output of $C_{2L}$ which is coupled to the rectifier 13, amplified at 14 and at logic 15 determines the direction of the wheel approach which determination is confirmed as the wheel passes from $C_{2L}$ to $C_{2R}$. A stopped wheel can be detected in this situation because any wheel presence in the field F of core $C_1$ disturbs that field, because the system is dynamic. Since the field F alternates in accordance with the current of oscillator 12, the changing field F provides its own dynamic signal rather than depending upon a moving wheel for cutting field lines and generating a current.

In its simpliest form, the system would be operable with merely one secondary core $C_2$ (L or R); however, the additional secondary core plus the output logic necessary for providing directional indication as well as presence detection is particularly useful especially in railroad operations.

Figure 2:
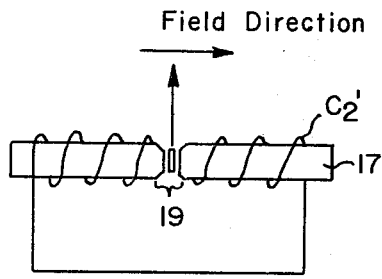
FIGS. 2 and 3 show apparatus necessary for an alternate form of the present invention.
Figure 3:
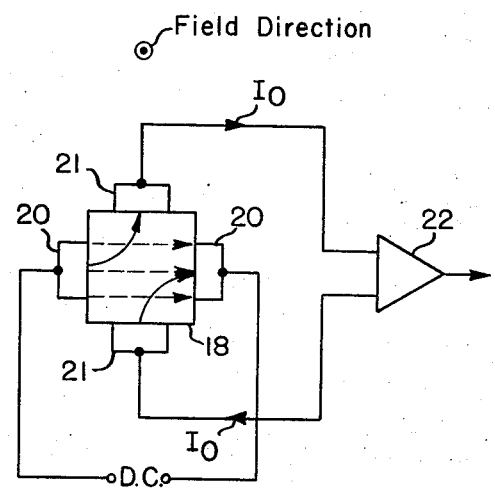

FIGS. 2 and 3 show apparatus which could be used for an alternate embodiment using a Hall-Effect device.

In FIG. 2 the secondary coil $C_2'$ is wrapped around a split core 17. The primary coil $C_1$ shown in FIG. 1 is no longer driven by oscillator 12 but by some direct current source. A Hall-Effect device 18 is placed in slit 19 in core 17. Again, the coil $C_2'$ and core 17 is placed in the field F such that no output is delivered from Hall-Effect device 18.

FIG. 3 illustrates the operation of the Hall-Effect device 18. Input electrodes 20 couple a D.C. bias across the device, and current flows in the direction of the dotted arrows. However, if a magnetic field is introduced across the device 18 (out of drawing), then the current flows as indicated by the solid arrows in the device to output electrodes 21. The current is detected and amplified by amplifier 22 which provides a signal to output logic 15.

The operational basis of the embodiment shown in FIGS. 2 and 3 is dynamic, because the current flowing in the Hall-Effect device 18 is set by the D.C. bias and is flowing as long as said bias exists. The field F produced by the primary $C_1$ has no effect in the device because the secondary $C_2'$ has been placed in the field F such that the net flux passing through the core 17 is zero. Once a vehicle wheel disrupts the field, a net flux passes through secondary core 17 and coil $C_2'$ causing a deflection in the current flow of the Hall-Effect device 18.

Directional information may be provided as shown in FIG. 1 before, by including two secondaries for producing successive presence signals and subsequent analysis by the output logic. Another alternative is to analyze the polarity output currents from the Hall-Effect device. A net field (out of the page) as shown in FIG. 2, produces a current $I_0$ with a direction as indicated on the output leads 21. If the net flux were reversed (into the page), however, the current would be reversed. It is therefore apparent that directional information may be obtained by polarity detection of output current.

While there has been described what are at present considered to be the preferred embodiments of the present invention, it will be obvious to those skilled in the art that various changes and modifications may be made therein without departing from the invention and it is therefore aimed in the appended claims to cover all such changes and modifications as fall within the spirit and scope of the invention.

What is claimed is:

1. Apparatus for detecting the presence of a ferromagnetic object along a right of way comprising:

a. a primary core adjacent to the right of way;
   b. a primary coil wound on said primary core, said primary coil energized with an alternating current input signal for generating a magnetic field and said primary coil wound on said primary core being positioned relative to the right of way so that a portion of the right of way is in the magnetic field generated from the primary coil;

c. a secondary core positioned adjacent to and on the same side of the right of way of said primary core and in the magnetic field generated from said primary coil across the portion of the right of way;

d. a secondary coil wound on said secondary core, said secondary coil responsive to the magnetic field generated from said primary coil;

e. said secondary core aligned in the magnetic field generated from said primary coil such that a null or zero output exists across the secondary coil; and f. output logic means connected to said secondary coil for detecting the signal change from the secondary coil as the ferro-magnetic object proceeding along the right of way interrupts and distorts the magnetic field generated from said primary coil.

2. The apparatus of claim 1 further including another secondary core with a secondary coil wound thereon and positioned adjacent to the primary core in the magnetic field generated from the primary coil across a portion of the right of way and the secondary coil aligned in the magnetic field such that a null or zero output exists across the secondary coil; and said output logic means is connected to both secondary coils and is responsive to signals from both secondary coils for providing directional indication relative to the movement of the ferro-magnetic object past the primary core along the right of way.

3. The apparatus of claim 2 wherein said secondary coils are arranged to produce distinctive outputs associated with their position relative to the primary core as the ferro-magnetic object proceeds along the right of way and the output logic means is adapted to respond to the distinctive outputs for providing the directional information.

4. The apparatus of claim 3 wherein an oscillator provides the alternating current input signals and rectifier means coupled to the secondary coil outputs at opposite polarities provides the distinctive outputs for indicating directional information regarding the movement of the ferro-magnetic object along the right of way.

5. Apparatus for detecting the presence of a ferro-magnetic object along a right of way comprising:

a. a primary core adjacent to the right of way;

b. a primary coil wound on said primary core, said primary coil energized with a direct current input signal for generating a magnetic field and said primary coil wound on said primary core being positioned relative to the right of way so that a portion of the right of way is in the magnetic field generated from the primary coil;

c. a secondary core positioned adjacent to said primary core and in the magnetic field generated from said primary coil across a portion of the right of way;

d. a secondary coil wound on said secondary core, said secondary coil responsive to the magnetic field generated from said primary coil;

e. said secondary coil aligned in the magnetic field generated from said primary coil such that a null or zero output exists across the secondary coil;

f. a device biased fro carrying a direct current and located within said secondary coil responsive to a net flux therein for producing an output indicative of the ferro-magnetic object proceeding along the right of way and through the magnetic field; and g. output logic means connected to said secondary coil for detecting the signal change from the secondary coil as the ferro-magnetic object proceeding along the right of way interrupts and distorts the magnetic field generated from said primary coil.

6. The apparatus of claim 5 further including an additional secondary core with an additional secondary coil wound thereon and aligned adjacent to the primary core similarly as the first secondary core in the magnetic field generated from the primary coil across a portion of the right of way, a second device located within said additional secondary coil biased for carrying a direct current responsive to a net flux for providing an object presence signal; and said output logic means is connected to both secondary coils and is responsive to signal outputs of both devices for providing directional indication relative to movement of the ferro-magnetic object past the primary along the right of way.

7. The apparatus of claim 5 wherein said device is responsive for producing one polarity signal or another in accordance with the direction of said net flux.

8. The apparatus of claim 7 wherein said output logic means is responsive to the signal output of said device for producing directional indication of the movement of the ferro-magnetic object along the right of way through the magnetic field in accordance with the polarity of said device output.

9. The apparatus of claim 5 wherein said device comprises a Hall-Effect solid state semi-conductor.

* * * * *